United States Patent
Ogasawara (10) Patent No.: US 6,882,482 B2
(45) Date of Patent: Apr. 19, 2005

(54) LIQUID-CRYSTAL LENS AND METHOD AND APPARATUS FOR DRIVING THE SAME

(75) Inventor: Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 38 days.

(21) Appl. No.: 10/657,701

(22) Filed: Sep. 9, 2003

(65) Prior Publication Data

US 2004/0108984 A1 Jun. 10, 2004

(30) Foreign Application Priority Data

Sep. 10, 2002 (JP) ........................................ 2002-263920

(51) Int. Cl.$^7$ ................................................ G02B 1/06
(52) U.S. Cl. ...................... 359/665; 359/742; 359/743; 359/565; 359/571; 359/666
(58) Field of Search ................................ 359/665–667, 359/742, 743, 565, 571

(56) References Cited

U.S. PATENT DOCUMENTS 6,288,846 B1 * 9/2001 Stoner, Jr. .................... 359/666

FOREIGN PATENT DOCUMENTS

JP          5-034656         2/1993

* cited by examiner

Primary Examiner—Scott J. Sugarman
(74) Attorney, Agent, or Firm—McGinn & Gibb, PLLC (57) ABSTRACT

A liquid-crystal lens includes a hologram liquid-crystal element having a liquid crystal which provides a light beam transmitting therethrough with a phase change so as to have a wavefront of a blaze-hologram shape; and a segment liquid-crystal element including a first electrode divided correspondingly to the blaze-hologram shape, a second electrode opposed to the first electrode and a liquid crystal for providing the transmitting light beam with a phase change by voltage application to the first and second electrodes, the segment liquid-crystal element being arranged coaxial to the hologram liquid-crystal element.

9 Claims, 14 Drawing Sheets

LIQUID-CRYSTAL LENS AND METHOD AND APPARATUS FOR DRIVING THE SAME

BACKGROUND OF THE INVENTION

1. Field of the Invention

The present invention relates to a liquid-crystal lens and method and apparatus for driving the same.

2. Description of the Related Art

Conventionally, a variable focal-length lens using a liquid crystal is known. The liquid-crystal lens has a structure in which a liquid crystal provided between transparent electrodes is formed on a glass substrate having the shape of a lens. In the liquid-crystal lens, the liquid crystal is changed in refractive index by changing the application voltage to the transparent electrodes, thereby electrically changing the focal length as a lens. However, the thickness of the liquid-crystal layer must be increased to achieve a sufficient change in focal length. This results in a drawback of requiring a large response time in reaching a desired focal length from a voltage application, in addition to the difficulty encountered in fabrication. This is because response time is inversely proportional to the square of the liquid-crystal layer thickness.

Meanwhile, there is another kind of the variable focal-length lens provided with a liquid crystal arranged between transparent electrodes on a glass substrate having the shape of a hologram lens, for example, disclosed in Japanese Patent Kokai No. 5-34656. In this case, however, variable focal length is available only where the phase step of hologram lies corresponding to integer times a wavelength of use. The intermediate voltage if applied to the liquid crystal causes deterioration of transmission efficiency (hologram diffraction efficiency).

SUMMARY OF THE INVENTION

The present invention has been made in view of the foregoing problems. The problem the invention is to solve includes the above-mentioned problem as one example. It is an object of the present invention to provide a high-performance liquid-crystal lens capable of broadly changing the focal length and a method and apparatus for driving the same.

To achieve the object, according to one aspect of the present invention, there is provided a liquid-crystal lens which comprises a hologram liquid-crystal element including a liquid crystal which provides a light beam transmitting therethrough with a phase change so as to have a wavefront of a blaze-hologram shape; and a segment liquid-crystal element including a first electrode divided correspondingly to the blaze-hologram shape, a second electrode opposed to the first electrode and a liquid crystal for providing the transmitting light beam with a phase change by voltage application to the first and second electrodes, the segment liquid-crystal element being arranged coaxial to the hologram liquid-crystal element.

According to another aspect of the present invention, there is provided a driving method for a liquid-crystal lens having a hologram liquid-crystal element for providing a phase change of a blaze-hologram shape to a transmitting light beam by voltage application thereto, and a segment liquid-crystal element including a first electrode divided correspondingly to the blaze-hologram shape, a second electrode opposed to the first electrode, and a liquid crystal for providing a phase change to the transmitting light beam by voltage application to the first and second electrodes, and arranged coaxial to the hologram liquid-crystal element, the driving method for a liquid-crystal lens which comprises a step of adjusting the voltage application to the hologram liquid-crystal element and the segment liquid-crystal element such that the light beam after transmitted through the hologram liquid-crystal element and the segment liquid-crystal element has a combined wavefront being continuous.

According to another aspect of the present invention, there is provided a driving apparatus for a liquid-crystal lens, which comprises a liquid-crystal lens having a hologram liquid-crystal element for providing a phase change of a blaze-hologram shape to a transmitting light beam by voltage application, and a segment liquid-crystal element including a first electrode divided correspondingly to the blaze-hologram shape, a second electrode opposed to the first electrode, and a liquid crystal for providing a phase change to the transmitting light beam by voltage application to the first and second electrodes, and arranged coaxial to the hologram liquid-crystal element, and a controller for controlling the voltage application to the hologram liquid-crystal element and the segment liquid-crystal element such that the light beam after transmitted through the hologram liquid-crystal element and the segment liquid-crystal element has a combined wavefront being continuous.

DETAILED DESCRIPTION OF THE INVENTION

Embodiments of the present invention will be explained in detail with reference to the drawings. In the figures which are referenced in the following description, the substantially equivalent elements are attached with the same numerals.

First Embodiment

Figure 1:
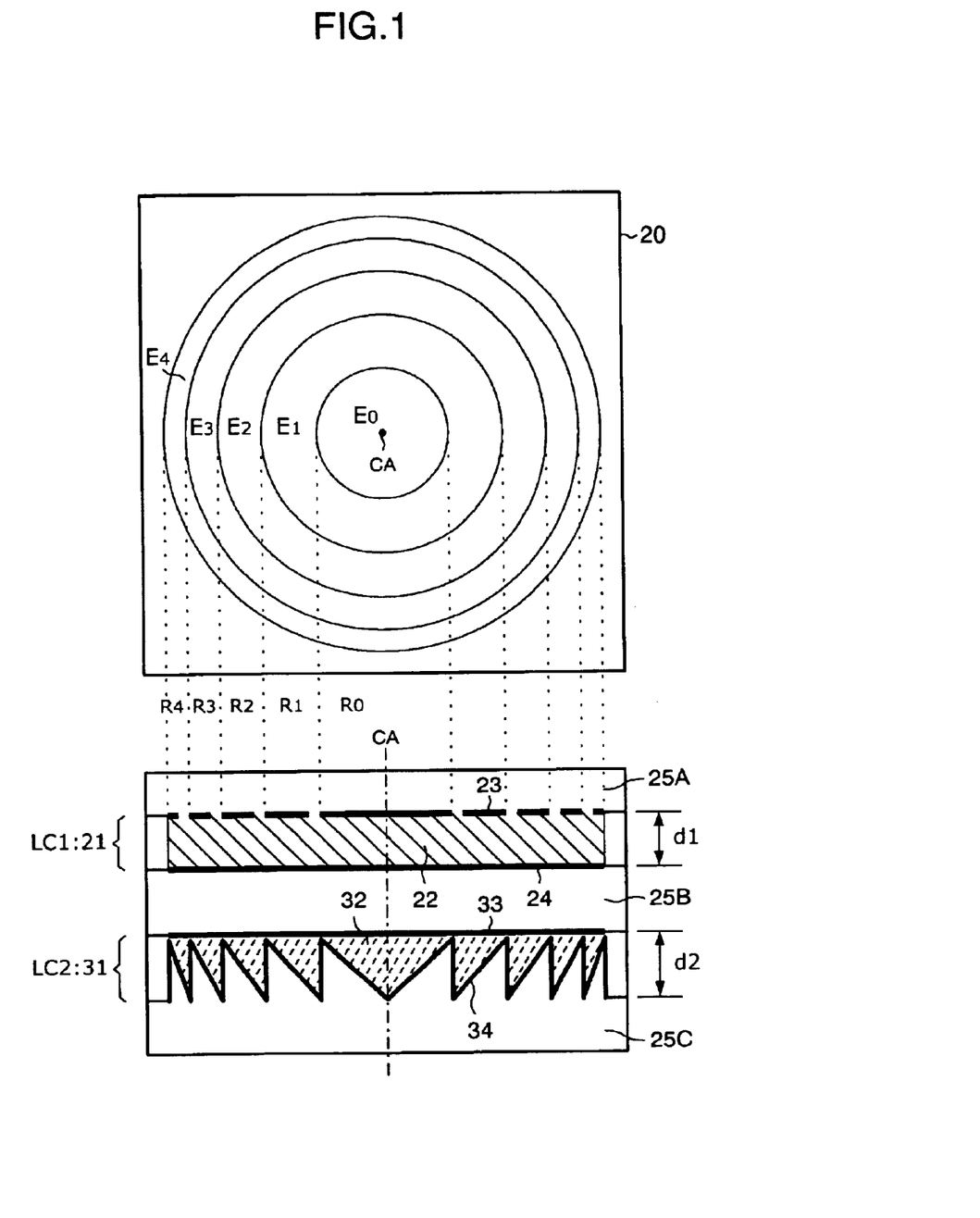
FIG. 1 is a plan view and sectional view of a liquid-crystal lens according to a first embodiment of the present invention.

FIG. 1 is a plan and sectional view of a liquid-crystal lens 20 according to a first embodiment of the present invention. As shown in the lower sectional view in FIG. 1, a liquid-crystal lens 20 is formed with a glass substrate 25A, a segment liquid-crystal element 21 as a first liquid-crystal element (LC1), a glass substrate 25B, a hologram liquid-crystal element 31 as a second liquid-crystal element (LC2), and a glass substrate 25C.

More specifically, the segment liquid-crystal element 21 is formed by a transparent electrode 23 divided into a plurality of segment electrodes, a transparent electrode 24, and a liquid crystal 22 encapsulated between the electrodes. Meanwhile, the hologram liquid-crystal element 31 is structured as a liquid-crystal Fresnel lens, having a liquid crystal 32 encapsulated between the glass substrate 25B and the glass substrate 25C having a sawtooth-shape in cross section to provide a diffraction grating of a blaze-hologram having a sawtooth-shape in cross section, and transparent electrodes 33, 34 arranged at the both sides of the liquid crystal 32 to apply a voltage to the liquid crystal 32. The segment liquid-crystal element 21 and the hologram liquid-crystal element 31 are coaxially arranged. Note that the substrate 25A, 25B, or 25C is not limited to glass and may be formed of a transparent material, e.g. a resin or the like.

The electrode 23 of the segment liquid-crystal element 21 is divided in substantially concentric circular shapes so as to correspond to the phase steps or blaze shape of the hologram liquid-crystal element 31 as shown in the upper plan view of FIG. 1. In more detail, the electrode 23 is structured by a plurality of transparent segment electrodes, in a concentric or annular form, divided with the spacing corresponding to a grating spacing of the diffraction grating of the hologram liquid-crystal element 31. For example, as shown in FIG. 1, the hologram liquid-crystal element 31 has five ring zones. Accordingly, the electrode 23 is structured by five concentric or annular transparent segment electrodes Ei (i.e. E0, E1, E2, E3, E4). On the other hand, the electrode 24 is formed over the entire surface of the liquid crystal 22. The foregoing transparent electrodes 23, 24, 33, 34 are formed from indium-thin oxide (ITO), for example.

Incidentally, the following description is made for the hologram liquid-crystal element 31 which has five ring zones for the purpose of simplification of description, but the invention is not limited to the case. Note that, in this case, the electrode 23 of the segment liquid-crystal element 21 may be divided suitably to the number of ring zones of the hologram liquid-crystal element 31.

The segment liquid-crystal element 21 and the hologram liquid-crystal element 31 have the respective thickness d1 and d2. The segment liquid-crystal element 21 and the hologram liquid-crystal element 31 are formed to be applied with voltages independently.

Description is now made on a case that laser light of a predetermined wavelength ($\lambda$) is incident vertically on the liquid-crystal lens 20, i.e. such that the laser light at its optical axis (OA) is coincident with a center axis (CA) of the liquid-crystal lens 20.

Figure 2:
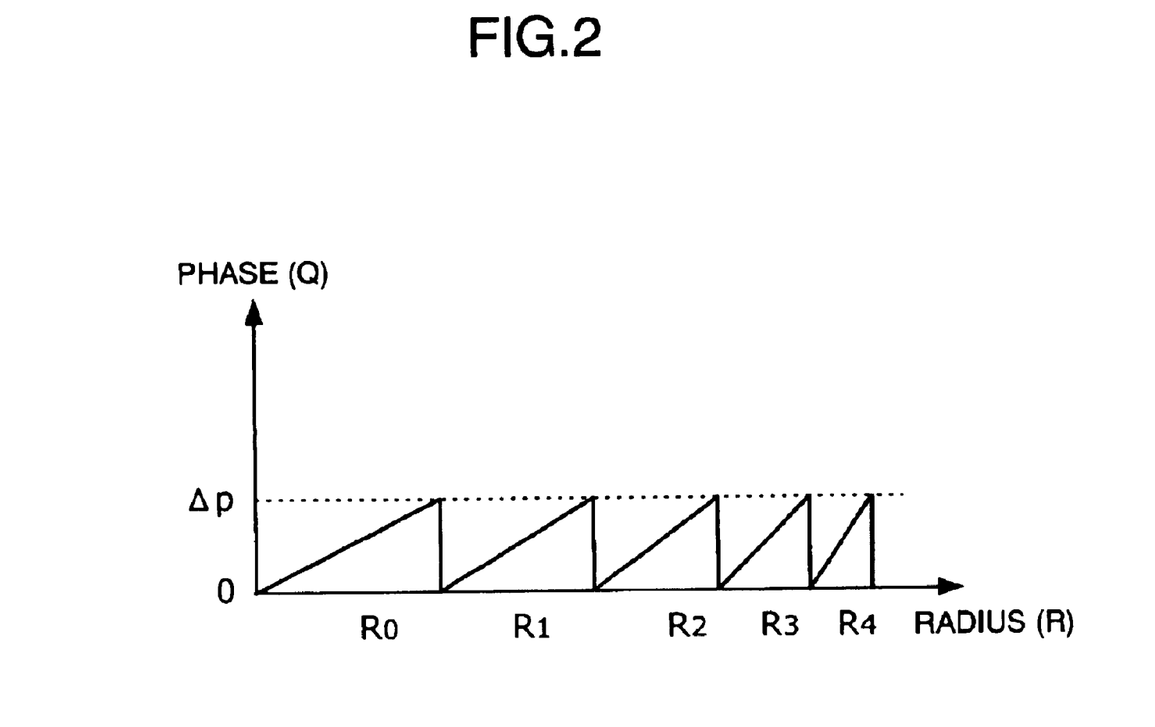
FIG. 2 is a graph schematically showing a phase Q of a transmission light through a hologram liquid-crystal element (LC2) during voltage application.

FIG. 2 schematically shows a phase Q of transmission light with respect to a center of the hologram liquid-crystal element (LC2) 31 in the case where a voltage is applied across the electrodes 33, 34 of the hologram liquid-crystal element (LC2) 31. In other words, this figure shows a wavefront of transmission light when a voltage is applied across the electrodes 33, 34 of the hologram liquid-crystal element (LC2) 31. Incidentally, shown is a radial phase from the center of the hologram liquid-crystal element 31, for simplifying the figure. More specifically, the liquid crystal 32 is changed in refractive index by the applied voltage whereby the light transmitting through the hologram liquid-crystal element 31 is changed in phase depending upon a blaze shape or form of the hologram liquid-crystal element 31. As shown in FIG. 2, in the case the diffraction grating is even in height (or depth) and in a sawtooth diffraction grating shape (rectangular triangular), in accordance therewith a phase sectional profile of the transmission light becomes a sawtooth shape (rectangular triangular) having a phase step of $\Delta p$. In the case that the phase step $\Delta p$ is integer times a wavelength of incident light, the hologram liquid-crystal element 31 serves as a hologram lens. However, in the case that the $\Delta p$ is not integer times a wavelength of incident light, the efficiency of diffraction decreases thereby lowering the function as a lens.

Figure 3:
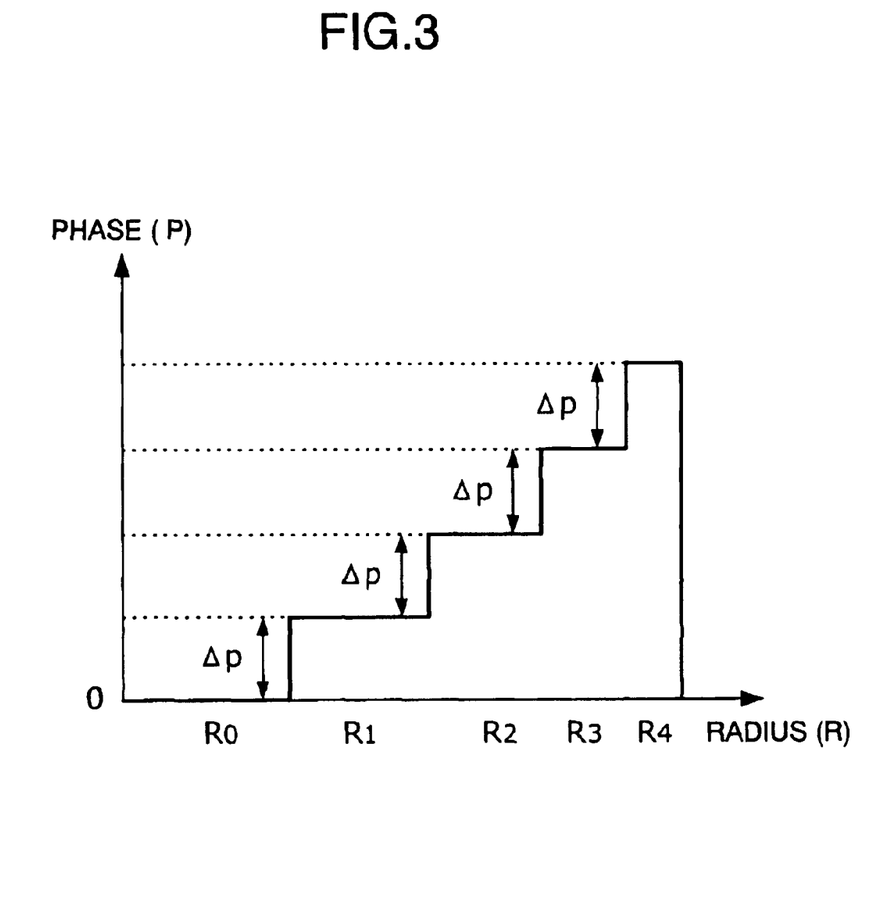
FIG. 3 is a graph schematically showing a phase P of a transmission light through a segment liquid-crystal element (LC1) during voltage application.

FIG. 3 is schematically showing a phase P of transmission light with respect to a center of the segment liquid-crystal element (LC1) 21 in the case where voltages are applied between the electrode 23 and the electrode 24 of the segment liquid-crystal element (LC1) 21. In other words, this figure shows a wavefront of transmission light when the voltages are applied to the electrodes 23, 24 of the segment liquid-crystal element (LC1) 21. Incidentally, the hologram liquid-crystal element (LC2) 31 and the segment liquid-crystal element (LC1) 21 are arranged in an axial alignment. The segment electrodes Ei (=E0–E4) of the electrode 23 on the segment liquid-crystal element (LC1) 21 are applied with voltages to provide phase steps ($\Delta p$), in which the phase step ($\Delta p$) is equal to the phase step of the hologram liquid-crystal element 31. In other words, voltages Vi (=V0–V4) are applied to the respective segment electrodes Ei (=E0–E4) of the electrode 23 such that the transmission light is provided with phase differences $\Delta Pi = (i-1) \Delta p$ in the corresponding segment regions Ri (=R0–R4) to the segment electrodes Ei (=E0–E4).

Figure 4:
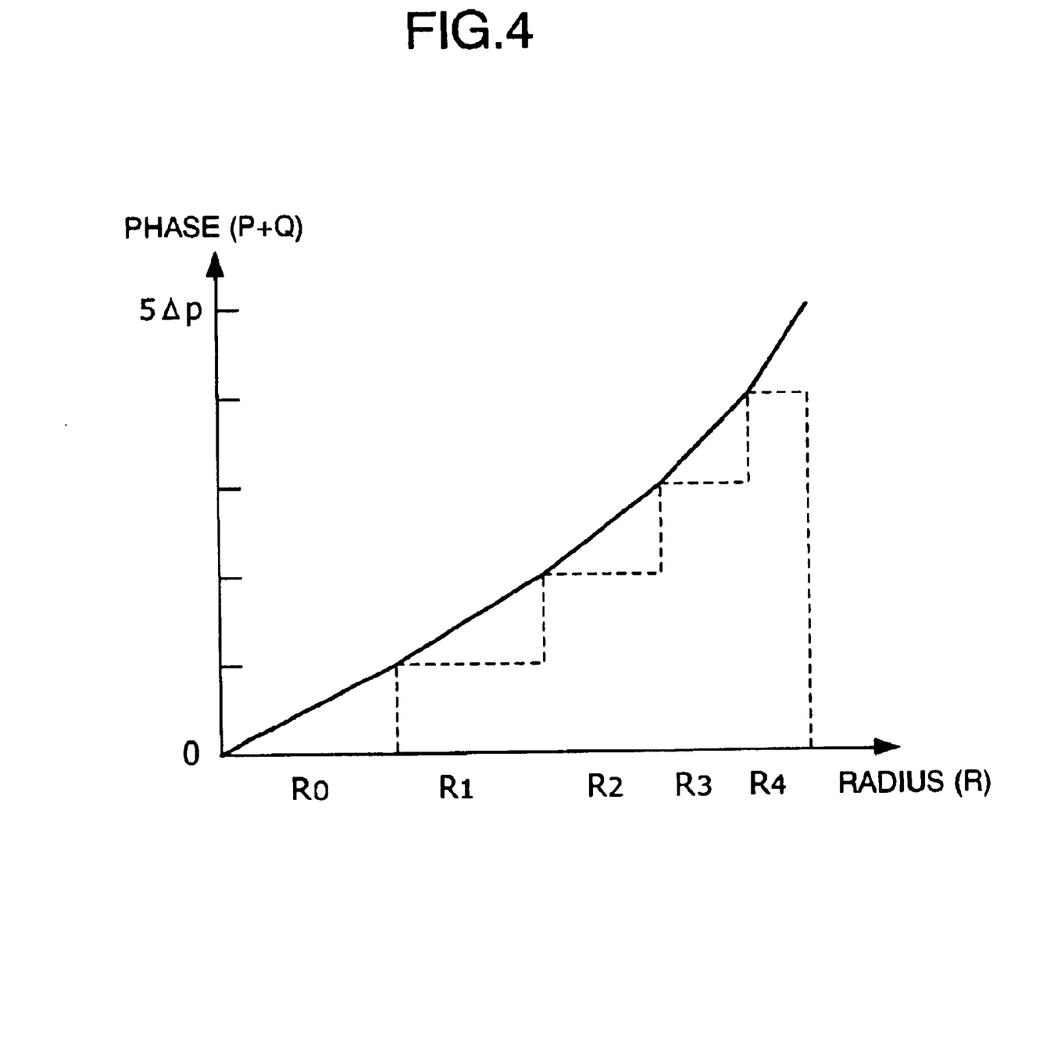
FIG. 4 is a graph schematically showing a phase change P+Q of a transmission light through the hologram liquid-crystal element (LC2) and segment liquid-crystal element (LC1)

FIG. 4 schematically shows a phase change P+Q of a transmission light passed through the hologram liquid-crystal element (LC2) 31 and the segment liquid-crystal element (LC1) 21. In other words, this figure shows a combined wavefront of light passing through the liquid-crystal lens 20. As shown in the figure, the incident light on the liquid-crystal lens 20 is provided with a phase change due to the hologram liquid-crystal element 31 and segment liquid-crystal element 21 so as to have a continuous wavefront. Accordingly, the liquid-crystal lens 20 serves as a lens.

Incidentally, although this embodiment is described for a hologram liquid-crystal element 31 having a diffraction grating of even depth and of a rectangular triangular blaze shape in cross section, the present invention is not limited to the specific embodiment. The hologram liquid-crystal element 31 may be provided with a hologram liquid-crystal in various blaze shapes, to obtain a liquid-crystal lens variable in focal length. In brief, in case using a predetermined hologram liquid-crystal element 31, the electrode 23 on the segment liquid-crystal element 21 is divided into a plurality of segment electrodes to apply voltages Vi to the segment electrodes Ei such that the resultant or resultant wavefront is continuous which is formed by a phase change due to the segment liquid-crystal element 21 and a phase change due to the hologram liquid-crystal element 31.

Now, explained is a drive control method for the liquid-crystal lens 20 when providing an incident light with a large phase change, thereby greatly changing the focal length.

Figure 5:
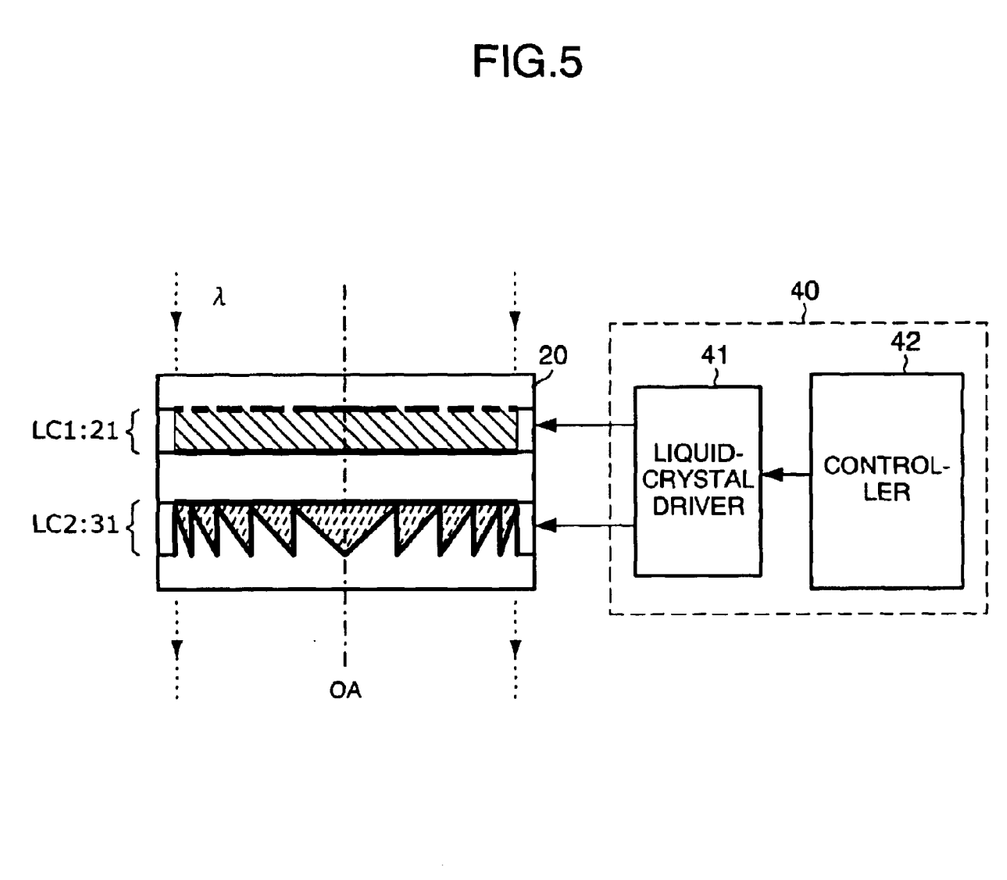
FIG. 5 is a block diagram showing a configuration of a driving apparatus for the liquid-crystal lens.

FIG. 5 is a block diagram showing a configuration of a driving device 40 of the liquid-crystal lens 20. The driving device 40 has a liquid-crystal driver 41 and a controller 42 for controlling the liquid-crystal driver 41. The driving device 40 supplies drive voltages to the segment liquid-crystal element 21 and the hologram liquid-crystal element 31, and a controller 42 for controlling the liquid-crystal driver 41.

In order to greatly change the focal length, there arises a need to use a liquid crystal having a large thickness. However, as mentioned before, there arises a problem that a response time is increased for obtaining a desired focal length by voltage application. According to the present invention, a large phase change can be caused to greatly change the focal length without the need to increase the thickness of a liquid-crystal layer. In this embodiment, the application voltages to the segment liquid-crystal element 21 and the hologram liquid-crystal element 31 are placed under control such that the total phase difference caused by the segment liquid-crystal element 21 and the hologram liquid-crystal element 31 does not exceed the maximum phase difference λmax as defined by a thickness of the liquid crystal 22, 32. The maximum phase difference λmax can be appropriately determined depending upon a structure of the segment liquid-crystal element 21 and the hologram liquid-crystal element 31, thickness of the liquid crystal used in the element 21 and/or 31, and so on.

Figure 6:
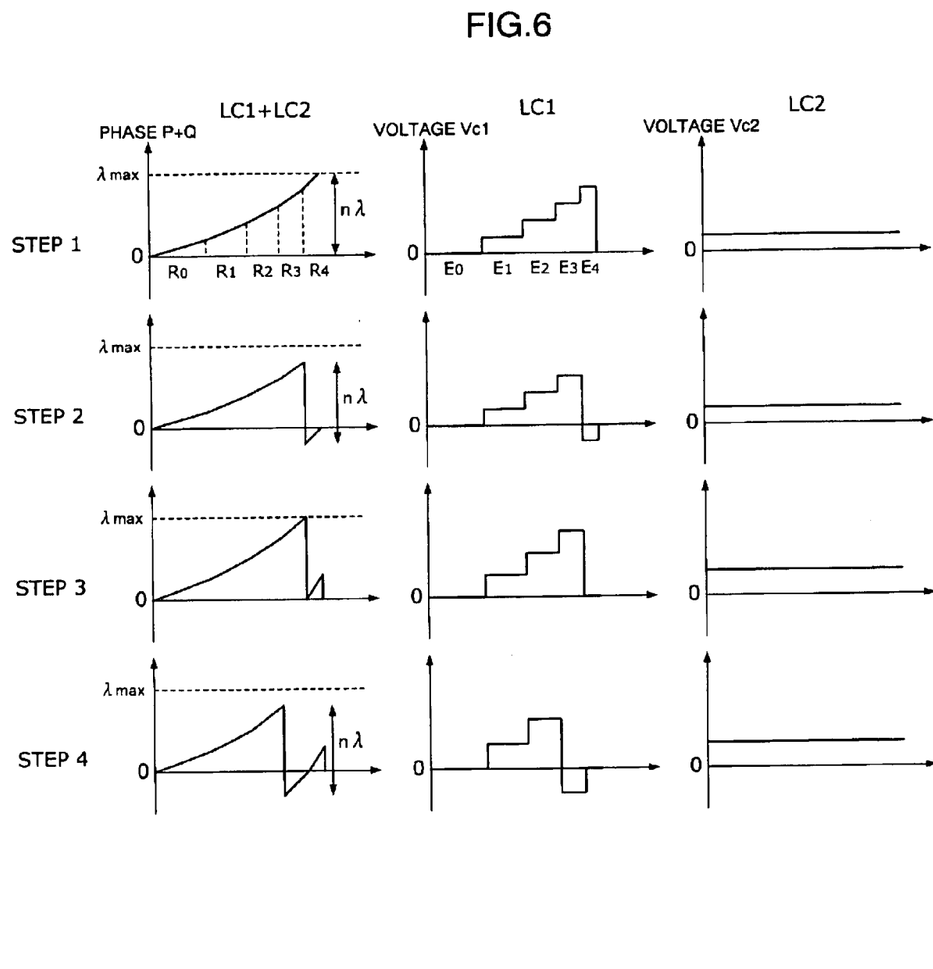
FIG. 6 is a graph showing a driving control method for a liquid-crystal lens in the case of changing a focal length exceeding the maximum phase difference λmax.
Figure 7:
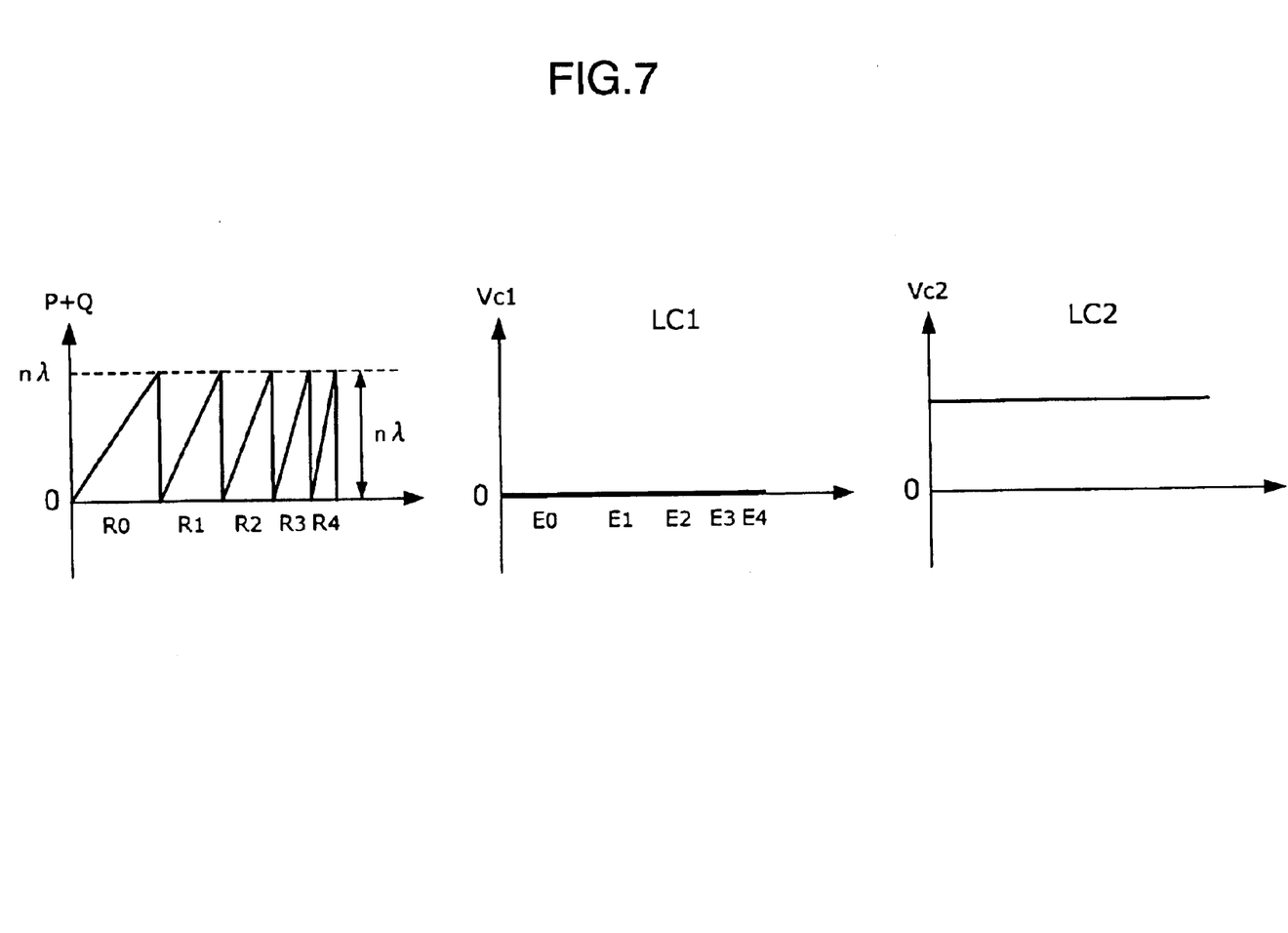
FIG. 7 is a graph schematically showing a driving control method for a liquid-crystal lens in the case of changing a focal length exceeding the maximum phase difference λmax.

Now, description is made on a drive control method for the liquid-crystal lens 20 when changing the focal length exceeding the maximum phase difference λmax with reference to FIGS. 5 to 7. At first, the controller 42 controls the liquid-crystal driver 41, to apply voltages Vc1, Vc2 respectively to the segment liquid-crystal element 21 and the hologram liquid-crystal element 31. By the aforementioned method the controller 42 controls the application voltages Vc1 and Vc2 to the segment liquid-crystal element 21 till the combined phase reaches a maximum phase difference λmax with respect to the center of the liquid-crystal lens 20 as a reference position (i.e. combined phase P+Q=0 at a radius r=0). In other words, increased are the voltages Vi (=V0–V4) applied to the segment electrodes Ei on the segment liquid-crystal element (LC1) 21 and the voltage Vc2 applied to the hologram liquid-crystal element 31, in a manner to satisfy a condition that each of the phase steps due to the segment liquid-crystal element (LC1) 21 is equal to the corresponding phase step due to the hologram liquid-crystal element 31 and the light after passed through the liquid-crystal lens 20 has a combined wavefront in a continuous wavefront (STEP 1 in FIG. 6).

When the combined phase due to the liquid-crystal lens 20 reaches a maximum phase difference λmax, the controller 42 reduces the application voltage (V4) to the relevant segment electrode (E4) so that the phase in a region (R4) reaching the maximum phase difference λmax can be reduced an integer times a wavelength (nλ: n is a natural number) (STEP 2). In this state, a phase step is generated at between the regions R3 and R4. However, because the phase step is in a magnitude of integer times the wavelength (nλ), the light is continuous in wavefront at the connection between the regions R3 ands R4. Accordingly, the liquid-crystal lens 20 serves as a lens.

Then, similarly to the case of the above STEP 1, the application voltages Vc1, Vc2 to the segment liquid-crystal element 21 and the hologram liquid-crystal element 31 are controlled until the combined phase reaches the maximum phase λmax (STEP 3).

When the combined phase by the liquid-crystal lens 20 reaches the maximum phase difference λmax, the controller 42 reduces the application voltage (V3) to the relevant segment electrode (E3) such that the phase in a region (R3) reaching the maximum phase difference λmax is reduced by integer times a wavelength (nλ: n is a natural number) (STEP 4). In this state, a phase step is generated between the regions R2 and R3. However, because the phase step is in a magnitude of integer times the wavelength (nλ), the light has a continuous wavefront at the connection between the regions R2 ands R3. Accordingly, the liquid-crystal lens 20 serves as a lens.

By executing the control process shown as the STEPs 1 to 4 on all the segment electrodes, the liquid-crystal lens 20, as a whole, functions as a blaze hologram lens as shown in FIG. 7. In this state, the application voltages are substantially zero to the segment electrodes Ei (=E0–E4) of the segment liquid-crystal element 21, or the same voltages may be applied to the segment electrodes Ei, so as not to cause a substantial potential difference between the segment electrodes Ei. Also, when the focal length is to be increased further, the application voltage to the segment electrode in a region where the maximum value of phase difference exceeds λmax is reduced, so that the phase in the region is reduced by integer times a wavelength. Accordingly, it is possible to obtain a lens having a focal length to be changed in a broader range. Also, because the focal length can be broadly changed with a small-thickness liquid-crystal element as described above, it is possible to obtain a high-performance lens having a fast response time to a desired focal length. Furthermore, there is the advantages of being easy to manufacture, compact in size and light in weight.

Second Embodiment

Figure 8:
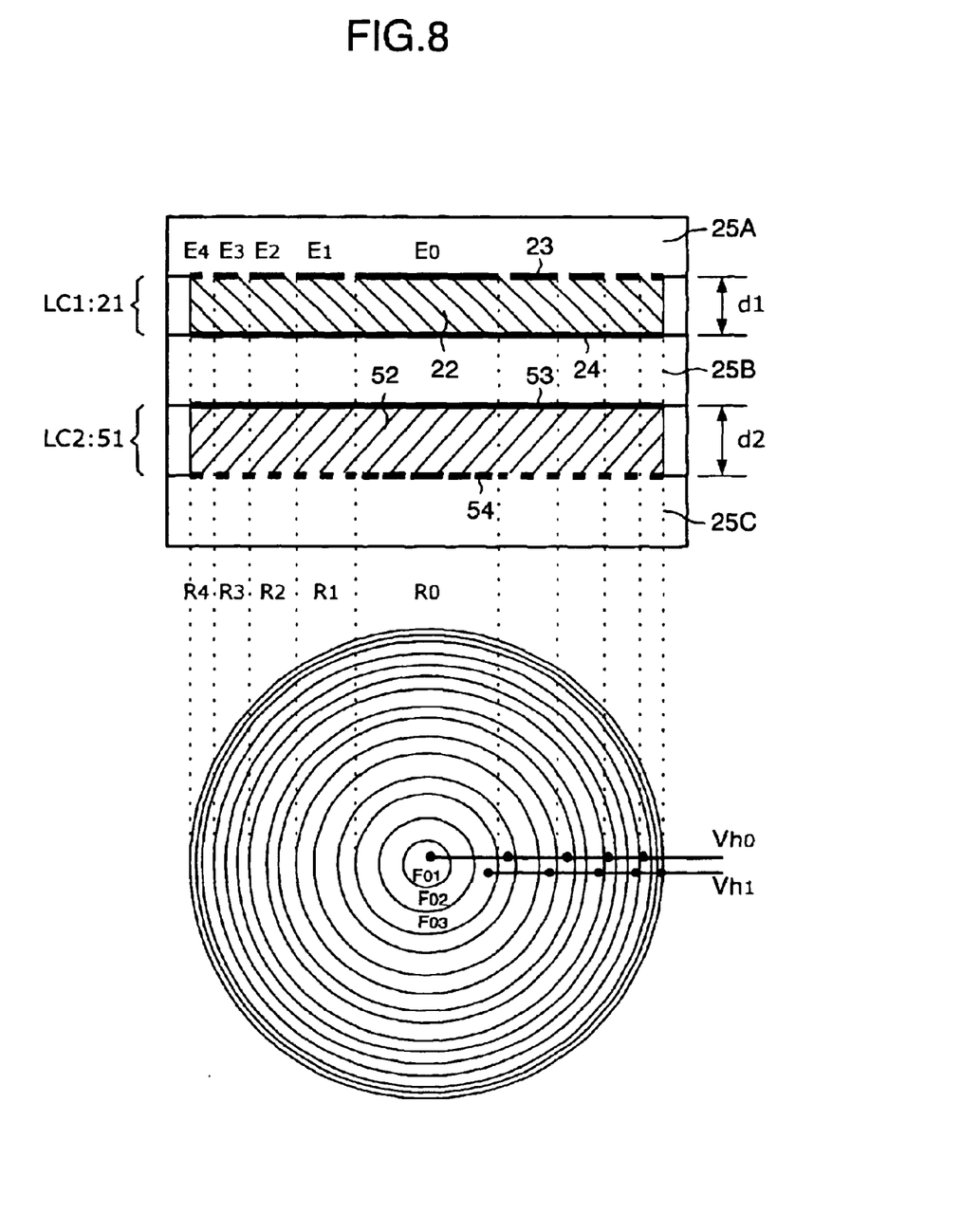
FIG. 8 is a sectional view of a liquid-crystal lens and a plane view of an electrode structure of a second liquid-crystal element LC2, according to a second embodiment of the invention.

FIG. 8 is a sectional view of a liquid-crystal lens 20 according to a second embodiment of the invention and a plan view showing an electrode structure of a second liquid-crystal element LC2 thereof. More specifically, in the embodiment as shown in the upper sectional view, a segment-type liquid-crystal element 51 is provided as a second liquid-crystal element (LC2) in place of the hologram liquid-crystal element 31 of the first embodiment. That is, a liquid-crystal element similar to the hologram liquid-crystal element is implemented using a liquid-crystal element having segment electrodes.

More specifically, the liquid-crystal element (LC2) 51 is structured with a liquid crystal 52 encapsulated to form a flat shape, a transparent electrode 53 and a transparent electrode 54 which is divided into a plurality of segment electrodes. The transparent electrode 53 is formed over the entire surface of the crystal liquid 52. Meanwhile, as shown in the plane view in the bottom of FIG. 8, the transparent electrode 54 has segment electrodes such that the area of the transparent electrode 54 corresponding to one period of the electrode 23 of the segment liquid-crystal element 21 is further finely divided. More specifically, the transparent electrode 54 has a structure that the corresponding areas to the regions (R0–R4) of the electrode 23 of the segment liquid-crystal element 21 are concentrically divided, e.g. into three regions. In other words, each of the regions corresponding to the regions Ri (i=0–4) of the electrode 23 are divided so as to form the segment electrodes Fi1, Fi2, Fi3.

Figure 9:
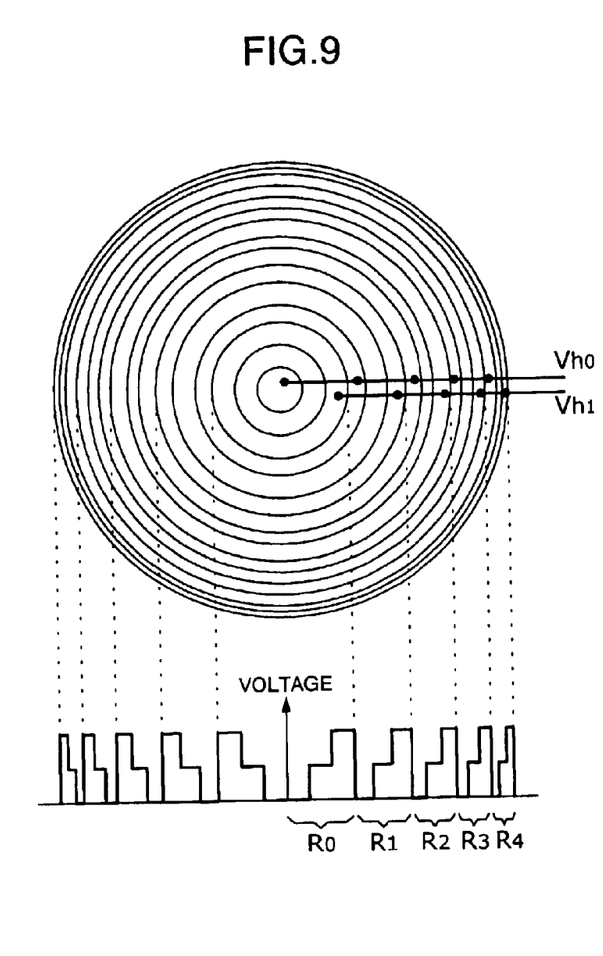
FIG. 9 is a figure showing a stepwise voltage distribution when voltages are applied to the inner and outer segment electrodes in each region of the liquid-crystal element (LC2)

As schematically shown in FIG. 9, a stepwise voltage distribution can be obtained by applying voltages Vh0 and Vh1 respectively to the inner and outer segment electrodes of each region of the liquid-crystal element (LC2) 51. With this structure, it is possible to implement a liquid-crystal element similar to the hologram liquid-crystal element and to reduce the number of lead electrodes (leads) to the segment electrodes.

The example was shown that the electrode 23 on the segment liquid-crystal element 21 is formed on the side of the substrate 25A while the electrode 54 on the liquid-crystal element 51 is formed on the side of the substrate 25C. However, one or both of the electrodes may be structurally formed on the side of the substrate 25B.

Similarly to the first embodiment, focal length can be broadly changed by controlling the voltages applied to the segment liquid-crystal element (LC1) 21 and the liquid-crystal element (LC2) 51. Also, the embodiment has various effects similar to those of the foregoing first embodiment.

Third Embodiment

Figure 10:
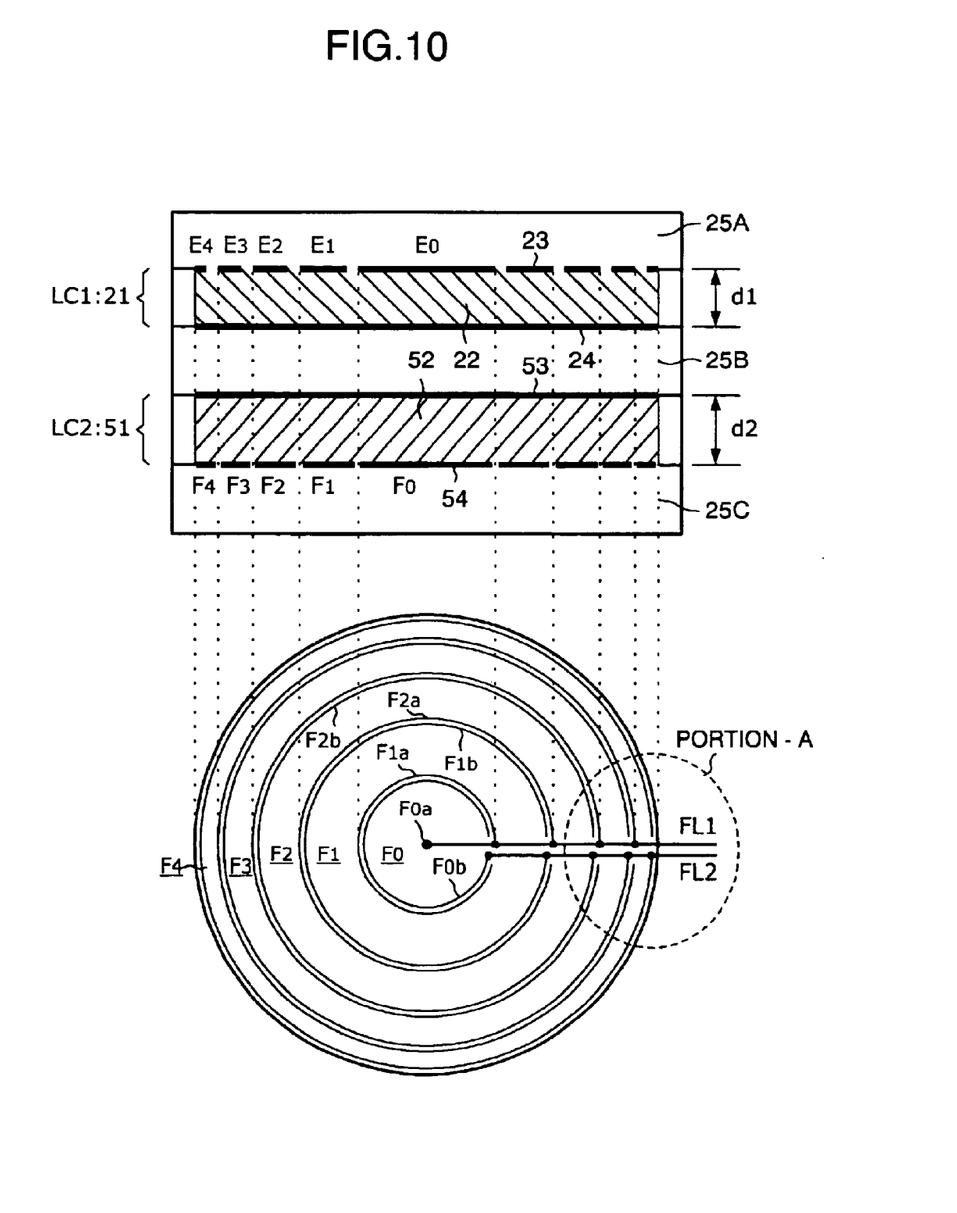
FIG. 10 is a sectional view of a liquid-crystal lens and a plan view of an electrode structure of a second liquid-crystal element LC2, according to a third embodiment of the invention.

FIG. 10 is a sectional view of a liquid-crystal lens 20 according to a third embodiment of the present invention and a plan view showing an electrode structure of a second liquid-crystal element LC2 thereof. This embodiment is similar to the second embodiment in that a segment-type liquid-crystal element 51 is used as a second liquid-crystal element (LC2) to thereby provide a liquid-crystal element having a capability similar to that of the hologram liquid-crystal element.

More specifically, as shown in the lower plan view of FIG. 10, the transparent electrode 54 of the liquid-crystal element LC2 has segment electrodes Fi (=F0–F4) concentrically divided in the regions corresponding to the segment regions Ri (R0–R4) of an electrode 23 on the segment liquid-crystal element 21. Meanwhile, a transparent electrode 53 is formed over the entire surface of a liquid crystal 52.

Figure 11:
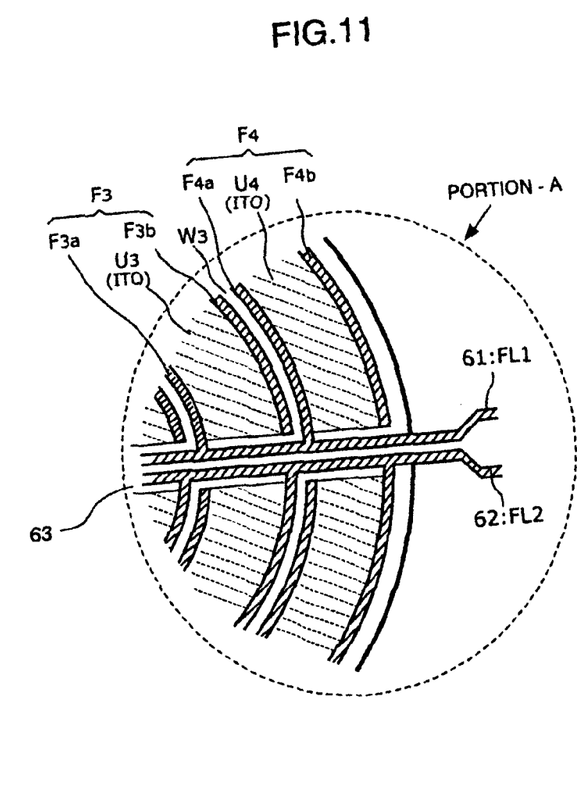
FIG. 11 is a partially enlarged view of the portion "A" in FIG. 10, showing a structure of segment and lead electrodes.

More specifically, further referring to a partially enlarged view of the portion "A" shown in FIG. 11, the segment electrodes Fi each includes electrodes Fia and Fib and a transparent conductive film Ui of a material of ITO (indium-thin oxide) or the like formed between the electrodes Fia and Fib. The segment electrodes Fi are separated by the gaps Wi. The electrodes Fia are Fib are formed of a (low-resistive) material having a higher conductivity than the transparent conductive film Ui, e.g. metal or the like. The transparent conductive film (ITO film) Ui is electrically connected to the electrodes Fia and Fib, while the gap Wi is formed in a width in a degree not to have an effect upon an incident beam. The gap Wi preferably has a width sufficiently small as compared to the width of the region Ri. For example, it is formed to have a width approximately several micrometers ($\mu$m).

Furthermore, as shown in FIGS. 10 and 11, lead electrodes 61 (FL1) and 62 (FL2) electrically isolated each other are formed in a slit area 63 formed along a radial direction. The electrodes Fia (i=0, 1, . . . , 4) are electrically connected to the lead electrode 61 (FL1) while the electrodes Fib (i=0, 1, . . . , 4) are electrically connected to the lead electrode 62 (FL2). Incidentally, the slit area 63 is formed sufficiently small as compared to the effective optical path area on the liquid-crystal element 21, 51 so as not to have an adverse effect upon phase adjustment, e.g. in a width of approximately several $\mu$m.

Figure 12:
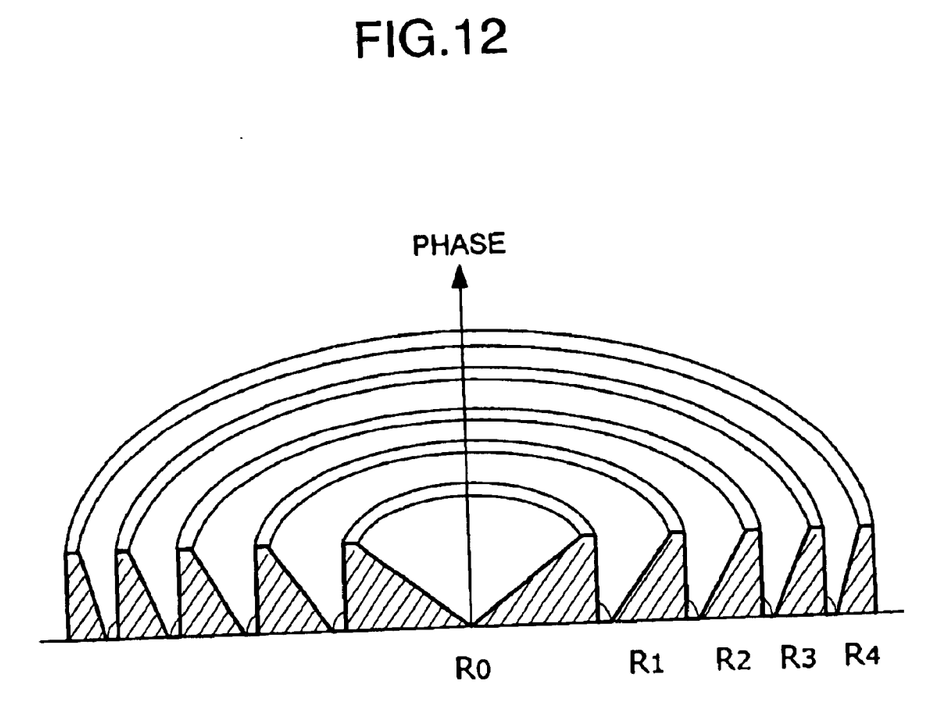
FIG. 12 is a view showing three-dimensionally and schematically a phase caused by a liquid-crystal when applying a voltage to the lead electrode, in the third embodiment.

In this embodiment, by applying voltages to the electrodes 53, 54, the liquid crystal 52 serves as a blaze-hologram diffraction grating. FIG. 12 is a three-dimensional view schematically showing a phase caused by the liquid crystal 52 with respect to the phase on the optical axis when applying voltages Vh0, Vh1 respectively to the lead electrodes 61 (FL1), 62 (FL2) for the electrode 54. Incidentally, the hatched portion in the figure represents a phase in a cross-section passing a center of the phase distribution.

As shown in FIG. 12, when voltages are applied, a phase distribution of a concentric blaze shape is generated in accordance with a resistivity of the transparent conductive film (ITO film) Ui. Thus, the liquid-crystal element 51 causes the similar effect to that of the blaze-hologram diffraction grating.

According to the configuration, a liquid-crystal element similar to the hologram liquid-crystal element can be implemented and, at the same time, the number of the lead electrodes (lead lines) for the segment electrodes can be reduced.

Similarly to the first embodiment, focal length can be broadly changed by placing under control the application voltage to the segment liquid-crystal element (LC1) 21 and the liquid-crystal element (LC2) 51. Furthermore, the liquid crystal lens of the embodiment possesses various advantages similar to those of the foregoing embodiment.

Fourth Embodiment

Figure 13:
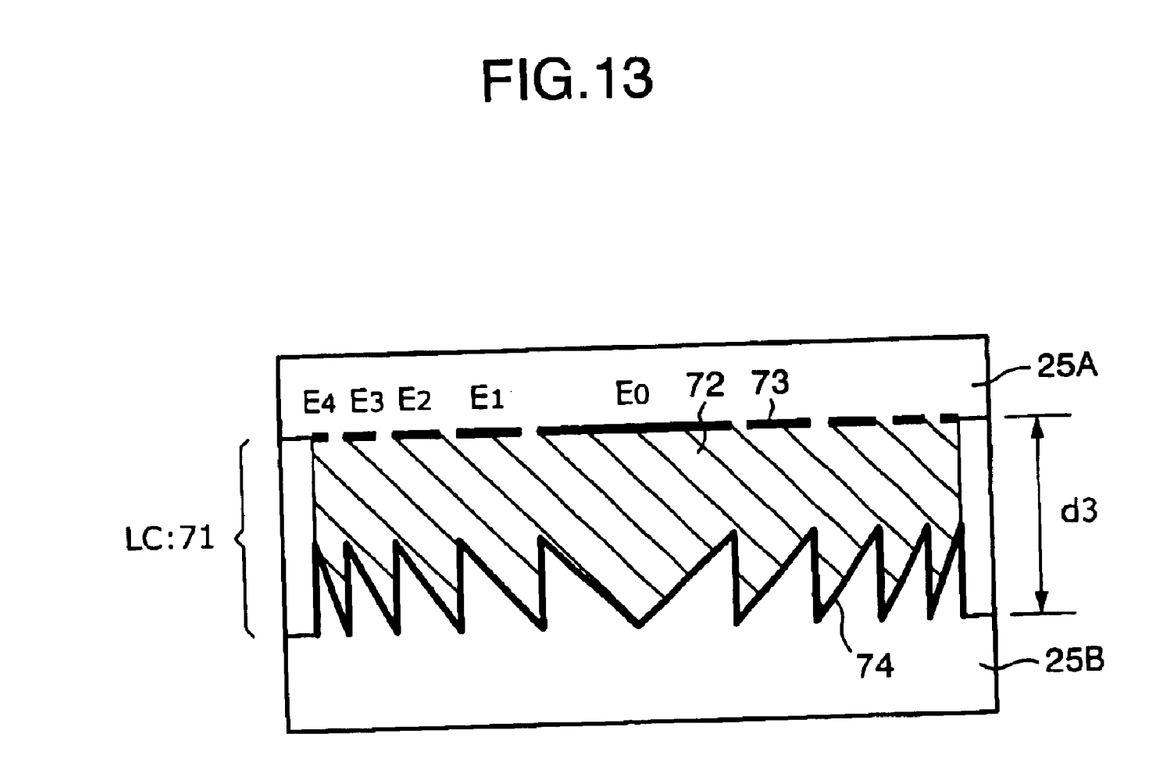
FIG. 13 is a sectional view of a liquid-crystal lens according to a fourth embodiment of the invention.

FIG. 13 is a sectional view of a liquid-crystal lens 20 according to a fourth embodiment of the invention. Although the segment-type liquid-crystal element (LC1) 21 and the hologram liquid-crystal element (LC2) 31 are used in the first embodiment, the liquid-crystal lens 20 can be configured by a single liquid-crystal element.

More specifically, a liquid-crystal element 71 is configured with a liquid crystal 72 having a blaze-hologram shape, a segment-type electrode 73 and a transparent electrode 74. The segment electrode 73 has a structure similar to the electrode 23 of the liquid-crystal element 21 of the first embodiment. With this structure, focal length can be broadly changed similarly to the first embodiment by controlling the application voltages to the electrodes 73, 74 similarly to the foregoing embodiment.

Meanwhile, it is possible to provide a liquid-crystal lens 20 configured only by a single liquid-crystal element in which a single liquid crystal is sandwiched by the electrodes 23, 54 of the second embodiment. Similarly, it is possible to provide a liquid-crystal lens 20 configured only by a single liquid crystal sandwiched by the electrodes 23, 54 of the third embodiment.

In these cases, various advantages are available similarly to the foregoing embodiments, e.g. capability of changing focal length in a broad range.

Fifth Embodiment

Figure 14:
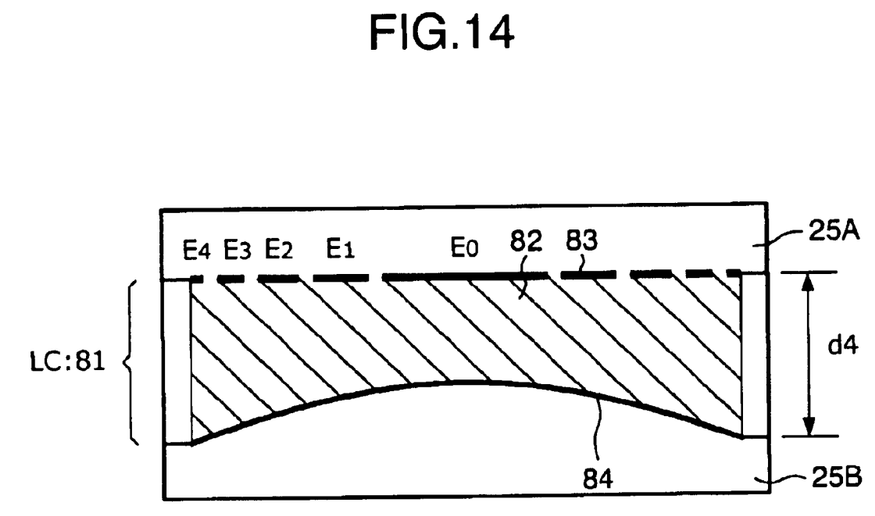
FIG. 14 is a sectional view of a liquid-crystal lens according to a fifth embodiment of the invention.

FIG. 14 is a sectional view of a liquid-crystal lens 20 according to a fifth embodiment of the present invention. A liquid-crystal element 81 is structured by a liquid crystal 82 encapsulated so as to have a lens form and transparent electrodes 83, 84 in a segment form. The segment electrode 83 has a structure similar to the electrode 23 of the liquid-crystal element 21 of the first embodiment. The electrode 84 is formed over the entire liquid-crystal surface in a concave form. With this structure, focal length can be broadly changed similarly to the foregoing embodiments by controlling the application voltages to the electrodes 83, 84 similarly to the foregoing embodiments.

As described in detail above, the liquid-crystal lens has a hologram liquid-crystal element for providing a light beam with a phase change so that the wavefront has a blaze-hologram shape, and a segment liquid-crystal element for providing the light beam with a phase change by voltage application to the electrode divided correspondingly to the blaze-hologram shape. Focal length can be broadly changed by controlling the application voltage to the liquid-crystal element such that the light beam after passing through the hologram and segment liquid-crystal elements has a combined wavefront being continuous. Also, because focal length can be broadly changed with a thin liquid-crystal element, it is possible to provide a high-performance lens having a fast response time required to reach a desired focal length. Furthermore, there are various advantages, for example, easy to manufacture, compact in size and light in weight.

Incidentally, the liquid-crystal lens is broadly applicable to various kinds of optical systems. For example, it can be used as a single lens or a beam expander or the like, or as an aberration-correcting optical element in various optical system. For example, application is possible to an optical pickup on a recording/reproducing apparatus such as an optical recording medium or the like.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2002-263920 which is hereby incorporated by reference.

What is claimed is:

1. A liquid-crystal lens, comprising:
   a hologram liquid-crystal element including a liquid crystal which provides a light beam transmitting therethrough with a phase change so as to have a wavefront of a blaze-hologram shape; and
   a segment liquid-crystal element including a first electrode divided correspondingly to the blaze-hologram shape, a second electrode opposed to the first electrode and a liquid crystal for providing the transmitting light beam with a phase change by voltage application to the first and second electrodes, the segment liquid-crystal element being arranged coaxial to the hologram liquid-crystal element.

2. A liquid-crystal lens according to claim 1, wherein the hologram liquid-crystal element has a hologram liquid crystal encapsulated in a blaze-hologram shape and an electrode for changing a magnitude of a phase change provided to the transmitting light beam by voltage application.

3. A liquid-crystal lens according to claim 1, wherein the hologram liquid-crystal element has a segment electrode divided correspondingly to the blaze-hologram shape, an opposing electrode opposed to the segment electrode, and a flat-plate-formed liquid crystal provided between the segment electrode and the opposing electrode, to cause an effect of blaze hologram by voltage application to the segment electrodes and the opposing electrodes.

4. A liquid-crystal lens according to claim 1, wherein the fist electrode comprises a plurality of transparent electrodes.

5. A liquid-crystal lens according to claim 1, wherein the first electrode includes a plurality of transparent electrodes and a low-resistance electrode comprised of a higher conductive material than the plurality of transparent electrodes and formed in an edge of the transparent electrode.

6. A driving method for a liquid-crystal lens having a hologram liquid-crystal element for providing a phase change of a blaze-hologram shape to a transmitting light beam by voltage application thereto, and a segment liquid-crystal element including a first electrode divided correspondingly to the blaze-hologram shape, a second electrode opposed to the first electrode, and a liquid crystal for providing a phase change to the transmitting light beam by voltage application to the first and second electrodes, and arranged coaxial to the hologram liquid-crystal element, the driving method for a liquid-crystal lens comprising a step of:
   adjusting the voltage application to the hologram liquid-crystal element and the segment liquid-crystal element such that the light beam after transmitted through the hologram liquid-crystal element and the segment liquid-crystal element has a combined wavefront being continuous.

7. A driving method according to claim 6, further comprising steps of:
   determining whether or not a phase difference to be provided to the light beam transmitting through the hologram liquid-crystal element and the segment liquid-crystal element is equal to or greater than a predetermined value, and
   adjusting the voltage application to a segment electrode of the first electrode to change an amount of a phase change by the segment electrode to a value subtracted a phase amount corresponding to integer times a wavelength of the light beam when the phase difference is determined equal to or greater than the predetermined value in the determining step.

8. A driving apparatus for a liquid-crystal lens, comprising:
   a liquid-crystal lens having a hologram liquid-crystal element for providing a phase change of a blaze-hologram shape to a transmitting light beam by voltage application, and a segment liquid-crystal element including a first electrode divided correspondingly to the blaze-hologram shape, a second electrode opposed to the first electrode, and a liquid crystal for providing a phase change to the transmitting light beam by voltage application to the first and second electrodes, and arranged coaxial to the hologram liquid-crystal element, and
   a controller for controlling the voltage application to the hologram liquid-crystal element and the segment liquid-crystal element such that the light beam after transmitted through the hologram liquid-crystal element and the segment liquid-crystal element has a combined wavefront being continuous.

9. A driving apparatus according to claim 8, further comprising a determining portion for determining whether or not a phase difference to be provided to the light beam transmitting through the hologram liquid-crystal element and the segment liquid-crystal element is equal to or greater than a predetermined value, wherein
   the controller adjusts the voltage application to a segment electrode of the first electrode to change an amount of a phase change by the segment electrode to a value subtracted a phase amount corresponding to integer times a wavelength of the light beam when the phase difference is determined equal to or greater than the predetermined value by the determining portion.

* * * * *